(12) United States Patent
Hara et al.

(10) Patent No.: US 8,014,262 B2
(45) Date of Patent: Sep. 6, 2011

(54) OPTICAL INFORMATION RECORDING MEDIUM

(75) Inventors: Fumi Hara, Gunma (JP); Takeshi Otsu, Gunma (JP); Masashi Satoh, Gunma (JP); Shingo Katoh, Gunma (JP); Isao Matsuda, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 481 days.

(21) Appl. No.: 12/104,078

(22) Filed: Apr. 16, 2008

(65) Prior Publication Data
US 2008/0259762 A1 Oct. 23, 2008

(30) Foreign Application Priority Data
Apr. 19, 2007 (JP) ................. 2007-110869

(51) Int. Cl.
*G11B 3/70* (2006.01)

(52) U.S. Cl. .............. 369/288; 369/283; 369/275.5; 428/64.4

(58) Field of Classification Search .......... 369/275.1, 369/275.5, 288, 284, 100, 94, 277, 275.4, 369/280; 428/64.1, 64.4, 64.8
See application file for complete search history.

(56) References Cited

U.S. PATENT DOCUMENTS

| 5,118,541 | A | 6/1992 | Yamamoto et al. | |
| 7,427,432 | B2 * | 9/2008 | Furomoto | 428/64.1 |
| 2007/0297315 | A1 * | 12/2007 | Aga et al. | 369/275.1 |
| 2009/0145549 | A1 * | 6/2009 | Komatsu et al. | 156/280 |

FOREIGN PATENT DOCUMENTS

| JP | 02-089239 A | 3/1990 |
| JP | 04-098630 A | 3/1992 |
| JP | 2003-036562 | 2/2003 |
| JP | 2003-045079 | 2/2003 |
| JP | 2003045079 A | 2/2003 |

OTHER PUBLICATIONS

Nakaue, et al. Sep. 2002. Evaluation of the mechanical properties of thin films using nanoindentation. *Kobe Steel Engineering Reports*, 52(2):74-77.

* cited by examiner

*Primary Examiner* — Ali Neyzari
(74) *Attorney, Agent, or Firm* — Law Office of Katsuhiro Arai

(57) ABSTRACT

An optical information recording medium includes a substrate having a through-hole provided at the central portion thereof and a guiding groove provided on a surface at the light-incident side; a reflective layer provided on the surface of the substrate having the guiding groove; a recording layer provided on the reflective layer and made of an organic substance containing a dye; and a light-transmissive cover layer provided on the recording layer, wherein the cover layer is made of a curable resin, and a modulus of elasticity of at least a portion of the cover layer facing the recording layer is in the range of about 34 MPa to about 96 MPa at 25° C.

18 Claims, 4 Drawing Sheets

OPTICAL INFORMATION RECORDING MEDIUM

BACKGROUND OF THE INVENTION

1. Field of the Invention

The present invention relates to an optical information recording medium, and in particular, to an optical information recording medium having a high recording density, such as a Blu-ray Disc in which a dye is used in a recording layer.

2. Description of the Related Art

Optical information recording media such as optical discs have been widely used as information recording media. An example of such an optical information recording medium is a CD Recordable (CD-R) disc produced by sequentially forming a reflective layer and a recording layer on a light-transmissive resin substrate having a thickness of 1.2 mm and a diameter of 120 mm or 80 mm. Recently, a high information recording density has been desired. Consequently, a system that uses a laser beam having a short wavelength and an objective lens having a large numerical aperture (NA) has been studied, and an optical information recording medium such as a DVD Recordable (DVD±R) disc has been realized. In order to increase the tolerance of a tilt angle (tilt) of a disc caused by a decrease in the wavelength and an increase in the NA, the DVD±R disc has a structure in which two light-transmissive resin substrates each having a thickness of 0.6 mm are bonded and a reflective layer and a recording layer are provided between the substrates.

However, recently, in order to record high-resolution graphic data, a higher information recording density has been desired. To meet this requirement, as in a Blu-ray Disc Recordable (BD-R) disc, an optical information recording medium has been proposed in which a reflective layer and a recording layer are provided at the light-incident side of a resin substrate having a thickness of 1.1 mm and a light-transmissive cover layer having a thickness of 0.1 mm is provided thereon.

As described in Japanese Unexamined Patent Application Publication No. 2003-45079, in an optical information recording medium, a reflective layer and a recording layer are sequentially formed on a resin substrate which has a thickness of 1.1 mm and in which a guiding groove (i.e., pregroove) is provided on a surface thereof, and a light-transmissive resin cover layer having a thickness of 0.1 mm is provided thereon. This optical information recording medium has the same diameter and thickness as CD-R and DVD±R discs. As disclosed in Japanese Unexamined Patent Application Publication No. 2003-36562, in order to protect a recording layer, a protective layer made of a light-transmitting inorganic material may be provided between the recording layer and a cover layer. The recording layer of such an optical recording medium is made of an organic substance containing a dye such as an azo dye or a cyanine dye; or an inorganic substance such as Si, Cu, Sb, Te, or Ge. Data is recorded in the recording layer by forming pits by laser irradiation for recording.

However, BD-R discs including a recording medium made of an organic substance are disadvantageous in that the degree of modulation is lower than that of BD-R discs including a recording medium made of an inorganic substance. Since a change in the optical path length of a recording layer made of an organic substance tends to be smaller than that of, for example, a recording layer made of an inorganic substance, the degree of modulation becomes low. Accordingly, one idea for increasing the change in the optical path length is to increase the depth of a guiding groove. However, an increase in the depth of the guiding groove increases the thickness of the recording layer. As a result, the recording layer contains a large amount of dye, and thus the reflectance before recording tends to be decreased. Consequently, the change in the optical path length decreases instead, thereby further decreasing the degree of modulation.

SUMMARY OF THE INVENTION

Accordingly, it is an object of the present invention to provide an optical information recording medium in which a satisfactory degree of modulation can be realized even when the recording medium includes a recording layer made of an organic substance.

According to a first technical embodiment of the present invention, an optical information recording medium includes a substrate having a through-hole provided at the central portion thereof and a spiral guiding groove provided on a surface thereof; a reflective layer provided on the surface of the substrate having the guiding groove; a recording layer provided on the reflective layer and made of an organic substance containing a dye; and a light-transmissive cover layer provided on the recording layer, wherein the cover layer is made of a curable resin, and a modulus of elasticity of at least a portion of the cover facing the recording layer is in the range of about 34 to about 96 MPa at 25° C.

The first technical embodiment is advantageous because of the novel concept that when a pit is formed during recording on an optical information recording medium, plastic-deforming a cover layer at the side facing a recording layer so as to have a shape in which the pit projects to the cover layer increases the change in the optical path length, and thus a satisfactory degree of modulation can be realized. According to the first technical embodiment of the present invention, the cover layer is deformed by heat generated from the recording layer during recording, and the deformation of the cover layer is maintained after cooling in such a manner that the cover layer has a shape in which the pit projects into the cover layer. Accordingly, the change in the optical path length is increased, and thus a satisfactory degree of modulation can be realized.

According to a second technical embodiment of the present invention, in the optical information recording medium of the first technical embodiment of the present invention, the cover layer comprises of a first resin layer and a second resin layer having a modulus of elasticity lower than the modulus of elasticity of the first resin layer, and the second resin layer preferably faces the recording layer.

According to the second technical embodiment of the present invention, the durability of the cover layer can be ensured by the first resin layer while a sufficient change in the optical path length is ensured by plastic-deforming the second resin layer during recording on the optical information recording medium.

In the optical information recording medium described in embodiments of the present invention, in order to protect the recording layer, a protective layer made of a light-transmissive inorganic material may be provided between the recording layer and the cover layer. Consequently, according to a third technical embodiment of the present invention, in the optical information recording medium of the first or second technical embodiment of the present invention, a protective layer is further provided between the recording layer and the cover layer, and an indentation plasticity-elasticity of the protective layer is about 40% or less.

In the case where the protective layer is provided between the recording layer and the cover layer, in order to achieve the advantages of the embodiments of the present invention, the protective layer is also deformed so as to conform with the deformation of the cover layer. According to the third technical embodiment of the present invention, the tendency of plastic deformation of the protective layer is stronger than the tendency of elastic deformation thereof. Accordingly, the protective layer is easily deformed so as to conform with the deformation of the cover layer. Consequently, a rate of change in carrier to noise ratio (C/N), i.e., ΔC/N, can be reduced to 1 dB or less, thus reducing the effect on the degree of modulation.

According to embodiments of the present invention, in an optical information recording medium including a recording layer made of an organic substance containing a dye, an optical information recording medium having a satisfactory degree of modulation can be obtained.

DESCRIPTION OF THE PREFERRED EMBODIMENTS

Figure 1:
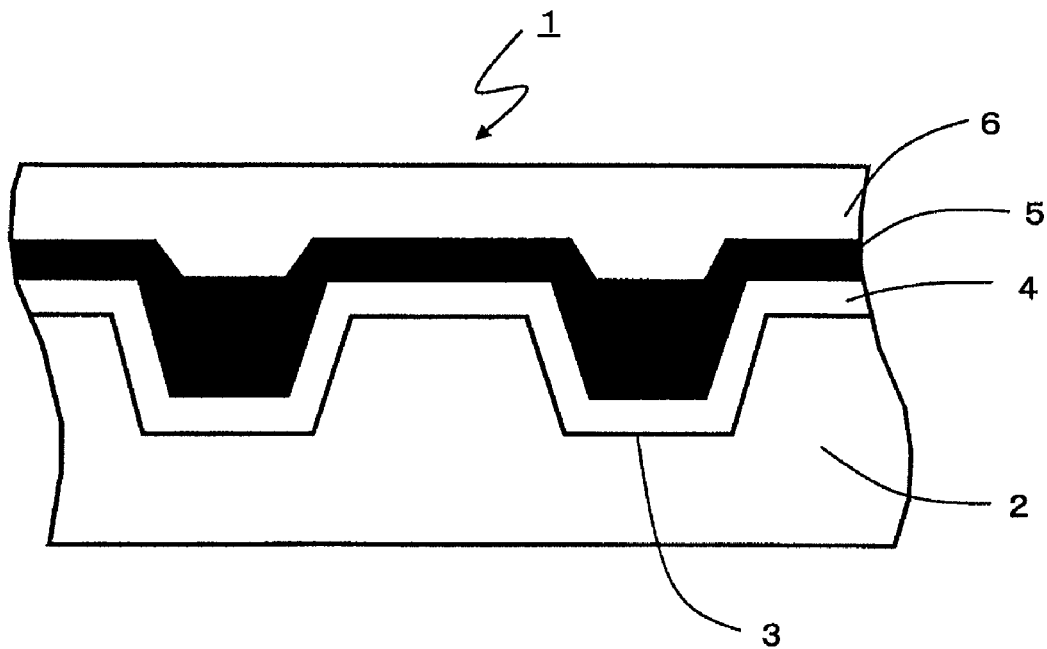
FIG. 1 is a schematic enlarged view of a cross section of an optical information recording medium according to a first embodiment of the present invention.
Figure 2:
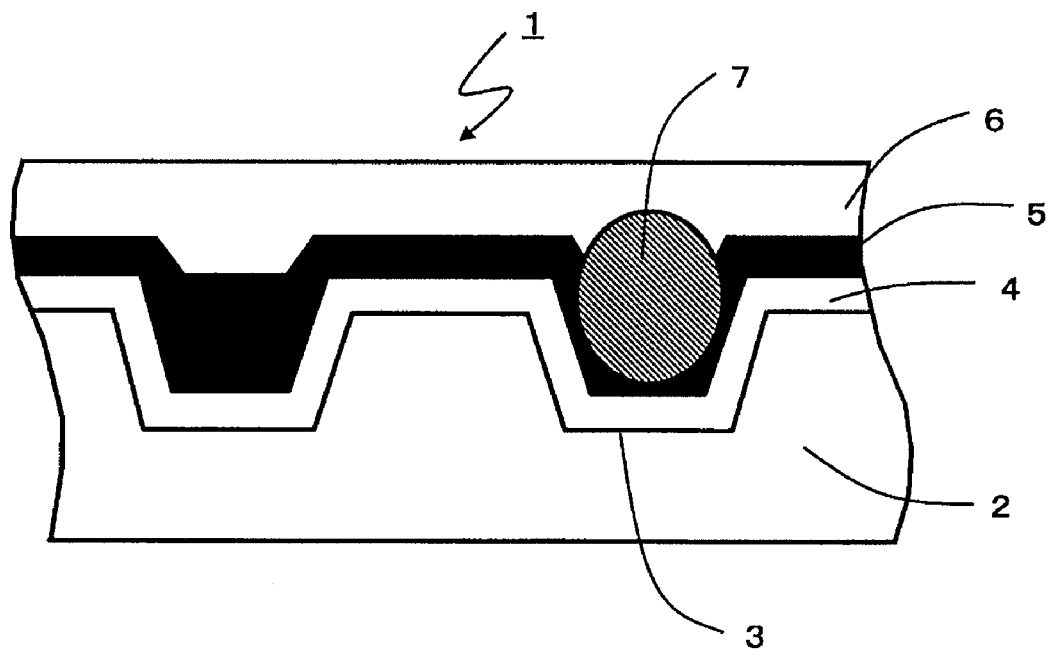
FIG. 2 is a schematic enlarged view of a cross section of the optical information recording medium after recording according to the first embodiment of the present invention.

An optical information recording medium according to a first embodiment of the present invention will now be described with reference to FIGS. 1 and 2. An optical information recording medium 1 shown in FIG. 1 includes a disc-shaped substrate 2 that has a through-hole (not shown) provided at the central portion thereof and a spiral guiding groove 3 provided on a surface thereof; a reflective layer 4 provided on the guiding groove 3 of the substrate 2; a recording layer 5 that is provided on the reflective layer 4 and that is made of an organic substance containing a dye; and a light-transmissive cover layer 6 provided on the recording layer 5.

The substrate 2 is a resin substrate having a thickness t of 1.1 mm and a diameter of 120 mm in the case of BD-R or CD-R. The described embodiments, however, can be used with media of different sizes. Various types of materials that are used for a substrate of known optical information recording media can be selected and used as the substrate 2. Specific examples thereof include polycarbonate, acrylic resins such as polymethylmethacrylate, vinyl chloride resins such as polyvinyl chloride and polyvinyl chloride copolymers, epoxy resins, amorphous polyolefins, polyester resins, metals such as aluminum, and glass. These materials may be used in combination or as a mixture, as needed. Among these materials, thermoplastic resins are preferable, and polycarbonate is particularly preferable from the standpoint of moldability, moisture resistance, dimensional stability, low cost, and the like. The substrate 2 may be formed by injection molding. When injection molding, a stamper is provided in a mold, and the spiral guiding groove 3 due to the stamper is formed on the substrate 2. This guiding groove 3 is formed at a pitch of 0.35 or 0.32 μm in the case of BD-R or CD-R, and pits are formed in this guiding groove 3. Other pitches may also be used, depending on the media.

The reflective layer 4 is composed of a thin film of a metal having a high reflectance, such as a silver (Ag) alloy or an aluminum (Al) alloy. The reflective layer 4 is formed by, for example, sputtering. The recording layer 5 is made of an organic substance containing a dye. The recording layer 5 is formed by, for example, applying a solution prepared by dissolving a dye such as an azo dye or a cyanine dye in tetrafluoropropanol (TFP) by spin coating.

The cover layer 6 is made of a light-transmissive resin. The cover layer 6 may be formed by applying a curable resin, for example by spin coating, that can be cured by ultraviolet light or radiation so that the resin has a thickness of about 0.1 mm. The cover layer 6 having a thickness of about 0.1 mm after curing has a light transmittance of 70% or more, and preferably 80% or more measured using a spectrophotometer with light having a wavelength of 405 nm. This cover layer 6 is made of a curable resin having a modulus of elasticity in the range of 34 to 96 MPa at 25° C. after curing. Herein, the modulus of elasticity at 25° C. is measured by a nanoindentation method (see Kobe Steel Engineering Reports, Vol. 52, No. 2 (September 2002) pp. 74-77, for an example of such method, herein incorporated by reference). The cover layer 6 made of a curable resin having a modulus of elasticity in the range of about 34 to about 96 MPa is relatively soft and scratches are easily formed on the cover layer 6. Therefore, a hard coat layer (not shown) made of an acrylic resin or the like may be provided on a surface at the light-incident side.

The operation of the optical information recording medium according to the first embodiment of the present invention will now be described with reference to FIG. 2. When the optical information recording medium 1 is irradiated with a laser beam for recording (not shown), the dye contained in the recording layer 5 in the guiding groove 3 is decomposed, thus forming a pit 7. In this step, heat is generated in the recording layer 5, and the heat thermally deforms the substrate 2 and the cover layer 6. Here, in order to ensure satisfactory tracking, the substrate 2 is made of a material that does not easily undergo thermal deformation. Therefore, the cover layer 6 having a modulus of elasticity lower than that of the substrate 2 is significantly thermally deformed away from the recording layer 5, as compared with the substrate 2. Consequently, the recording layer 5 and the cover layer 6 are both deformed away from each other, thereby defining the pit 7, which projects into the cover layer 6.

The shape of the pit 7, which projects into the cover layer 6, is maintained after cooling because the cover layer 6 has a relatively low modulus of elasticity. In this manner, since the pit 7 projects into the cover layer 6, the change in the optical path length is increased, and a space having a refractive index of approximately 1 is increased. Accordingly, the apparent change in the refractive index is improved, and thus, a satisfactory degree of modulation can be realized.

The reason why the modulus of elasticity of the cover layer 6 is specified in the range of about 34 to 96 about MPa will now be described. When the cover layer 6 has a low modulus of elasticity, the cover layer 6 easily undergoes thermal deformation. However, when the modulus of elasticity of the cover layer 6 is excessively low, spontaneous deformation of the cover layer 6 easily occurs because of a change over time after recording. For example, when a stress due to the weight of the optical information recording medium itself is applied to the pit 7 in the thickness direction of the optical information recording medium, a part of the pit 7 that projects into the cover layer 6 is deformed in the thickness direction, thereby decreasing the change in the optical path length. As a result, even when the degree of modulation is satisfactory, for example, 40% or more during recording, the degree of modulation is decreased to less than 40% because of a change over time. Therefore, a modulus of elasticity of about 34 MPa or more is advantageous so that a change in the degree of modulation over time can be suppressed. On the other hand, when the modulus of elasticity of the cover layer 6 is excessively high, the cover layer 6 is not easily thermally deformed. Accordingly, a pit that can provide a satisfactory degree of modulation during recording cannot be formed. Therefore, a modulus of elasticity of about 96 MPa or less is advantageous so that a satisfactory degree of modulation during recording, e.g., a degree of modulation of 40% or more, can be achieved.

The whole cover layer 6 need not have a modulus of elasticity in the range of about 34 to about 96 MPa. It is sufficient if only a part of the cover layer 6 facing the recording layer 5 has a modulus of elasticity in the range of about 34 to about 96 MPa. Here, the part of the cover layer 6 that faces the recording layer 5 and that has a modulus of elasticity in the range of about 34 to about 96 MPa is a part of the cover layer 6 ranging from the interface between the recording layer 5 and the cover layer 6 to a height in the range of about 19 to about 30 μm. Since the pit 7 is formed in the guiding groove 3, the thickness of the cover layer 6 at a position where the guiding groove 3 is present should be considered. Accordingly, in this case, the thickness described above in reference to the thickness of a part of the cover layer 6 that faces the recording layer 5 and that has a modulus of elasticity in the range of about 34 to about 96 MPa represents the thickness of the part of the cover layer 6 located on the guiding groove 3.

Figure 3:
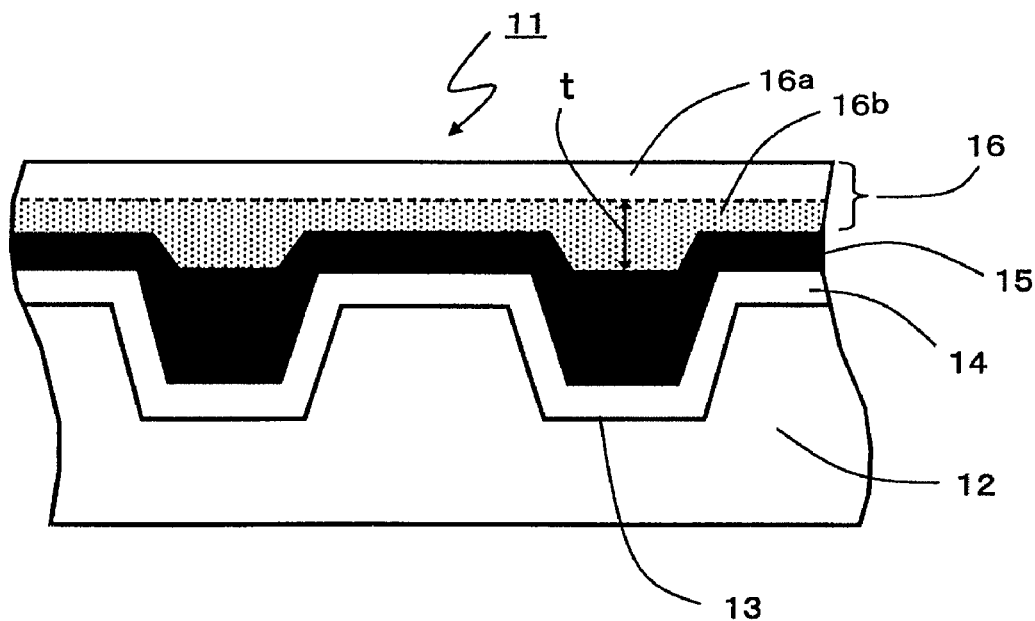
FIG. 3 is a schematic enlarged view of a cross section of an optical information recording medium according to a second embodiment of the present invention.
Figure 4:
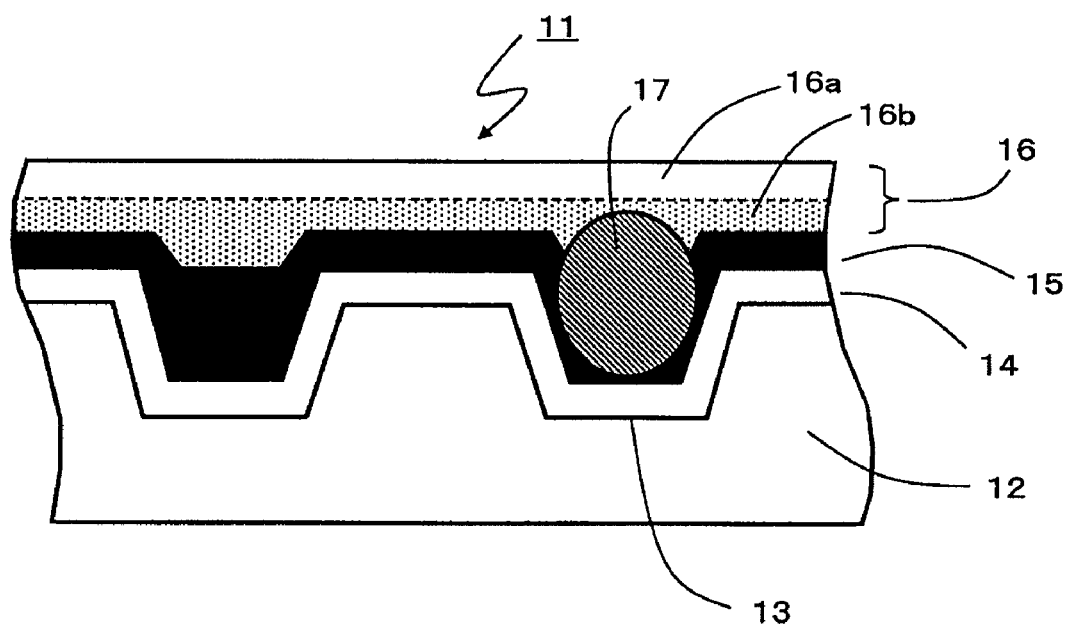
FIG. 4 is a schematic enlarged view of a cross section of the optical information recording medium after recording according to the second embodiment of the present invention.

An optical information recording medium according to a second embodiment of the present invention will now be described with reference to FIGS. 3 and 4. An optical information recording medium 11 shown in FIG. 3 differs from the optical information recording medium 1 of the first embodiment in that a cover layer 16 has a two-layer structure composed of a first resin layer 16a having a relatively high modulus of elasticity and a second resin layer 16b having a relatively low modulus of elasticity, and the second resin layer 16b faces a recording layer 15 and has a modulus of elasticity in the range of about 34 to about 96 MPa.

The cover layer 16 may be formed as follows. A reflective layer 14 and a recording layer 15 are sequentially formed on a surface of a substrate 12, the surface having a guiding groove 13 thereon. A curable resin used as the second resin layer 16b is then applied on the recording layer 15, such as by spin coating. After the second resin layer 16b is cured, another curable resin used as the first resin layer 16a is applied on the second resin layer 16b, such as by spin coating, and then cured. Thus, the cover layer 16 having a total thickness of about 0.1 mm is formed from the first resin layer 16a and the second resin layer 16b.

This second resin layer 16b constitutes a part that faces the recording layer 15 and that has a modulus of elasticity in the range of about 34 to about 96 MPa. Accordingly, the thickness t on the guiding groove 13 of the second resin layer 16b is preferably in the range of about 19 to about 30 μm. When the second resin layer 16b has a thickness within this range, the amount of deformation that can provide a satisfactory degree of modulation can be ensured.

The operation of the optical information recording medium according to the second embodiment of the present invention will now be described with reference to FIG. 4. When the optical information recording medium 11 is irradiated with a laser beam for recording (not shown), the dye contained in the recording layer 15 in the guiding groove 13 is decomposed, thus forming a pit 17. In this step, heat is generated in the recording layer 15, and the second resin layer 16b is thermally deformed away from the recording layer 15. Consequently, the pit 17 projects into the cover layer 16.

The shape of the pit 17, which projects into the second resin layer 16b, is maintained after cooling because the second resin layer 16b has a relatively low modulus of elasticity in the range of about 34 to about 96 MPa at 25° C. In this manner, since the pit 17 projects into the second resin layer 16b, the change in the optical path length is increased, and a space having a refractive index of approximately 1 is increased. Accordingly, the apparent change in the refractive index is improved, and thus, a satisfactory degree of modulation can be realized.

Figure 5:
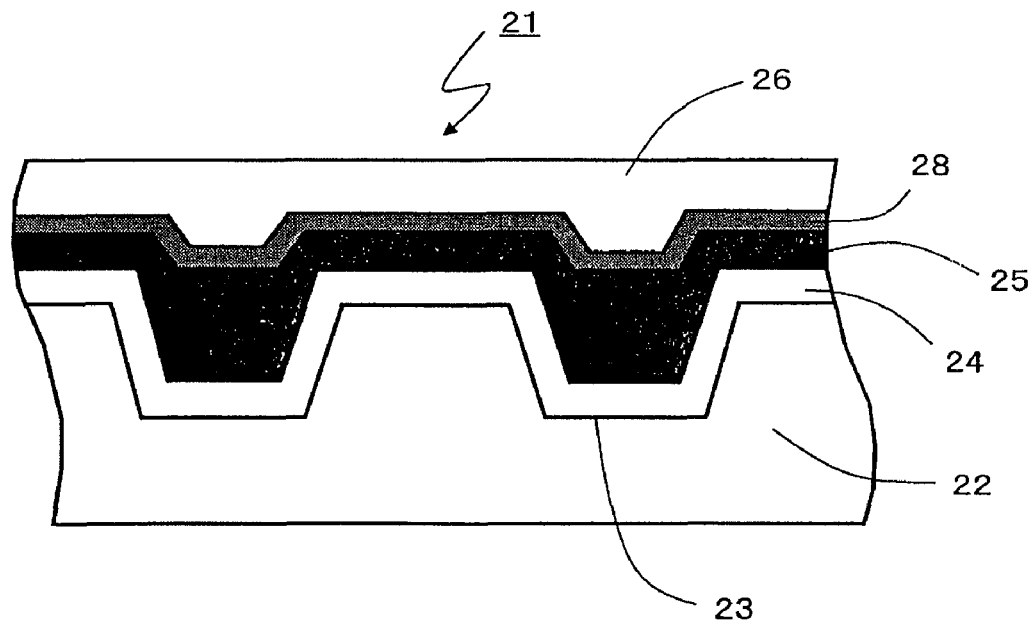
FIG. 5 is a schematic enlarged view of a cross section of an optical information recording medium according to a third embodiment of the present invention.

An optical information recording medium according to a third embodiment of the present invention will now be described with reference to FIGS. 5 to 7. An optical information recording medium 21 shown in FIG. 5 differs from the optical information recording medium 1 of the first embodiment in that a protective layer 28 made of a light-transmissive inorganic substance is provided between a recording layer 25 and a cover layer 26.

This protective layer 28 prevents a dye contained in the recording layer 25 from diffusing into the cover layer 26 during the formation of the cover layer 26 and prevents the occurrence of a mixing phenomenon such as immersion of, for example, a solvent of the curable resin for forming the cover layer 26 into the recording layer 25. Examples of the material constituting the protective layer 28 include oxides such as silicon oxides, in particular, silicon dioxide, zinc oxide, cerium oxide, and yttrium oxide; sulfides such as zinc sulfide and yttrium sulfide; nitrides such as silicon nitride; silicon carbide; mixtures of an oxide and sulfur; and alloys described below. The protective layer 28 is formed by, for example, sputtering.

In the optical information recording medium 21 having this structure, it is the protective layer 28 is deformed in addition to the cover layer 26. In order to conform the shape of the protective layer 28 with the deformation of the cover layer 26, the indentation plasticity-elasticity of the protective layer 28 is controlled to be 40% or less. As a result, a rate of change in C/N, i.e., ΔC/N can be reduced to 1 dB or less, thus reducing the effect on the degree of modulation. Here, the indentation plasticity-elasticity is defined as follows:

Indentation plasticity-elasticity [%]=(elastic-plastic deformation work)×100/(elastic-plastic deformation work+plastic deformation work)

Figure 6:
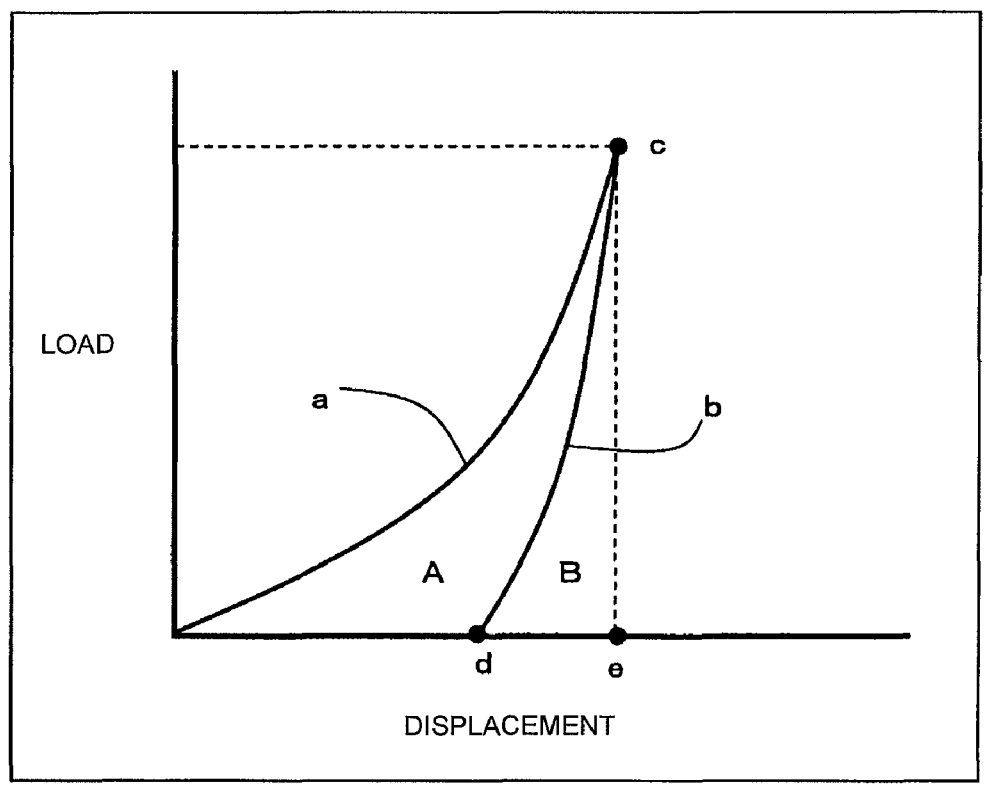
FIG. 6 is a graph showing a load curve and an unloading curve in a nanoindentation method.
Figure 7:
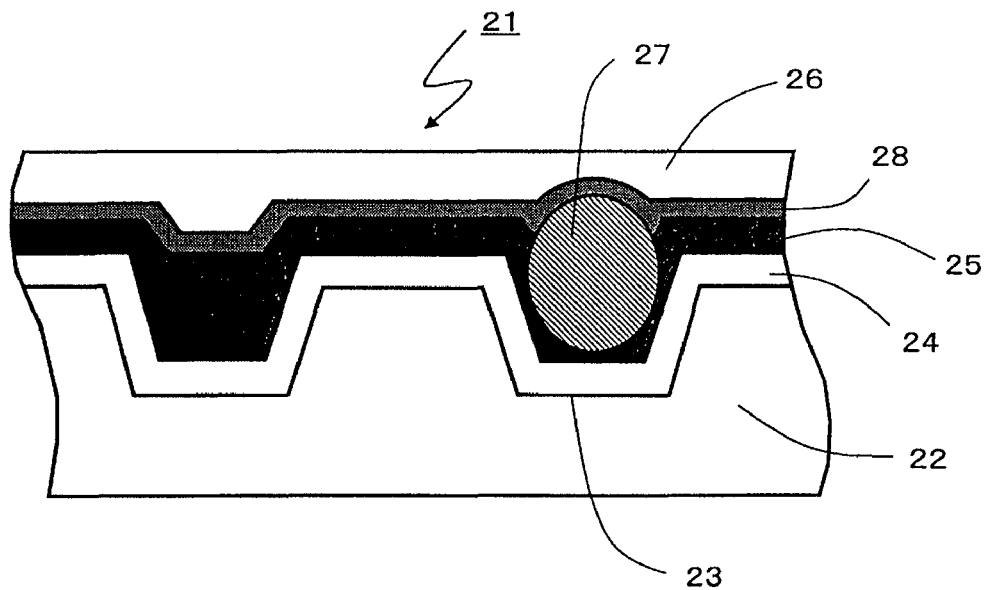
FIG. 7 is a schematic enlarged view of a cross section of the optical information recording medium after recording according to the third embodiment of the present invention.

The indentation plasticity-elasticity will now be defined in detail with reference to the graph shown in FIG. 6. In the nanoindentation method, as a test load applied to a sample increases, the displacement increases to displacement e following loading curve a. In this case, the relationship between the displacement and the load is represented by point c at displacement e and the maximum test load. Next, as the test load decreases, the displacement decreases to displacement d following unloading curve b. In this case, the area of region A defined by loading curve a, unloading curve b, and the axis of displacement is defined as plastic deformation work [N·m], and the area of region B defined by unloading curve b, the axis of displacement, and the vertical line that joins point c and point e is defined as elastic-plastic deformation work [N·m]. As represented by the above equation, when the indentation plasticity-elasticity decreases, point d is close to point e, and thus the area of region B decreases. As a result, the tendency of plastic deformation becomes stronger than the tendency of elastic deformation.

The operation of the optical information recording medium according to the third embodiment of the present invention will now be described with reference to FIG. 7. When the optical information recording medium 21 is irradiated with a laser beam for recording (not shown), the dye contained in the recording layer 25 in the guiding groove 23 is decomposed, thus forming a pit 27. In this step, heat is generated, and both the cover layer 26 and the protective layer 28 are thermally deformed away from the recording layer 25. Consequently, the pit 27 projects into the cover layer 26.

The shape of the pit 27, which projects into the cover layer 26, is maintained after cooling because the cover layer 26 has a relatively low modulus of elasticity in the range of about 34 to about 96 MPa at 25° C. Furthermore, since the protective layer 28 has an indentation plasticity-elasticity of 40% or less, the protective layer 28 has a strong tendency of plastic deformation. Accordingly, the protective layer 28 is deformed so as to conform with the deformation of the cover layer 26. In this manner, since the cover layer 26 is easily thermally deformed, the pit 27 projects into the cover layer 26. As a result, the change in the optical path length is increased, and a space having a refractive index of approximately 1 is increased. Accordingly, the apparent change in the refractive index is improved, and thus, a satisfactory degree of modulation can be realized. Furthermore, in this structure, the protective layer 28 is easily deformed so as to conform with the deformation of the cover layer 26. Consequently, ΔC/N can be reduced to about 1 dB or less, thus reducing the effect on the degree of modulation.

In this embodiment, a description has been made of an example in which the cover layer 26 is composed of a single resin layer. Alternatively, the cover layer 26 may be composed of two resin layers as described in the second embodiment. In such a case, the same advantage as in the second embodiment can be achieved. The lower limit of the indentation plasticity-elasticity of the protective layer 28 is not particularly limited. However, in order to prevent deformation of the protective layer 28 caused by a local application of pressure, the indentation plasticity-elasticity is preferably about 10% or more.

EXAMPLES

Advantages of the optical information recording medium of the present invention will now be described using examples.

First Example

Disc-shaped polycarbonate substrates each having an outer diameter of 120 mm and a thickness of 1.1 mm were prepared by injection molding. Each of the substrates had a through-hole at the central portion thereof and a guiding groove having a track pitch of 0.32 μm. A reflective layer made of a silver (Ag) alloy and having a thickness of 100 nm was formed by sputtering on a surface of each of the substrates, which surface had the guiding groove. Subsequently, a dye solution prepared by dissolving a dye shown in FIG. 8 in a TFP solvent was applied on each of the substrates by spin coating. The substrates were then dried at 80° C. for 30 minutes to form a recording layer. These substrates were prepared such that the number of substrates was equal to the number of samples to be tested.

Figure 8:
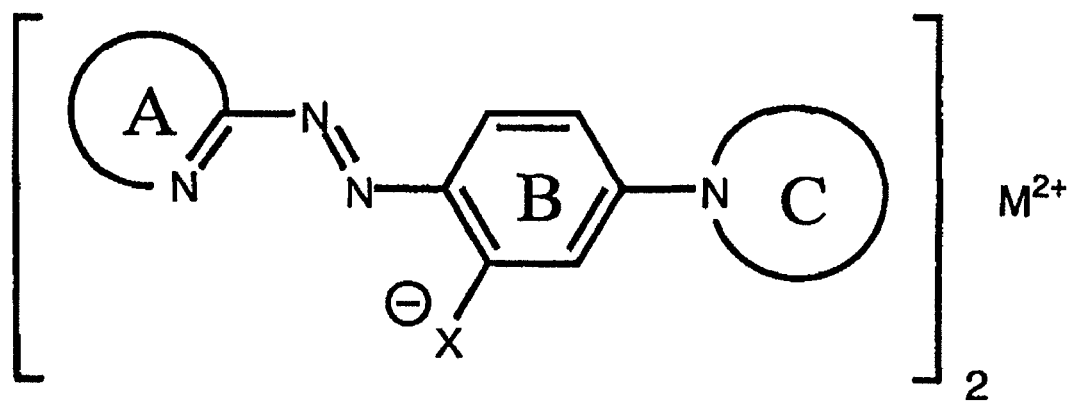
FIG. 8 shows a chemical formula representing an example of a dye used for a recording layer.

In the formula illustrated in FIG. 8, ring A represents a heterocyclic ring formed together with the carbon atom and the nitrogen atom to which ring A is bonded. Ring B represents a substituted or unsubstituted benzene ring. Ring C represents a heterocyclic ring containing the nitrogen atom to which ring C is bonded, and ring C may be bonded to ring B. $X^-$ represents a group that can have active hydrogen, and $M^{2+}$ represents a divalent metal cation. The formula represents a metal complex in which the anion forms an azo dye molecule as a whole and two of these azo dye molecules are bonded to one divalent metal cation $M^{2+}$.

Next, a plurality of types of UV-curable resins having different moduli of elasticity at 25° C. after curing were applied on the prepared samples by spin coating, and were then cured, thus forming a second resin layer having a thickness of 25 μm. Next, a UV curable resin whose modulus of elasticity at 25° C. after curing became 1,700 MPa was applied on each of the samples by spin coating, and then cured, thus forming a first resin layer. Thus, a cover layer having a thickness of 0.1 mm was formed from the first resin layer with the second resin layer.

Recording/reproducing characteristics of the optical information recording medium samples thus prepared were evaluated using a commercially available recording/reproducing system (for example, ODU-1000 manufactured by Pulstec Industrial Co., Ltd.) at a wavelength of 405 nm, a numerical aperture (NA) of 0.85, and a linear velocity of 4.92 m/s. First, an initial degree of modulation was determined. Subsequently, the samples were left to stand at 25° C. and at a humidity of 30% for one month, and the degree of modulation was again determined. Subsequently, the cover layer was separated from each of the substrates, and the dye was removed by washing. The modulus of elasticity of the second resin layer was measured at 25° C. by the nanoindentation method at a test load of 0.1 mN. Samples having a degree of modulation of 40% or more were evaluated as acceptable samples. Table 1 shows the results.

TABLE 1

| | Comparative Example 1 | Comparative Example 2 | Example 1 | Example 2 | Example 3 | Example 4 | Comparative Example 3 |
|---|---|---|---|---|---|---|---|
| Modulus of elasticity [MPa] | 14 | 27 | 34 | 56 | 77 | 96 | 117 |
| Initial degree of modulation [%] | 45 | 44 | 43 | 42 | 41 | 40 | 38 |
| Degree of modulation after one month [%] | 33 | 38 | 43 | 42 | 41 | 40 | 38 |

Referring to the above results, in the cases where the modulus of elasticity of the second resin layer was in the range of 34 to 96 MPa, a degree of modulation of 40% or more could be maintained after one month, and thus satisfactory results could be obtained.

Second Example

Disc-shaped polycarbonate substrates each having an outer diameter of 120 mm and a thickness of 1.1 mm were prepared by injection molding. Each of the substrates had a through-hole at the central portion thereof and a guiding groove having a track pitch of 0.32 μm. A reflective layer made of a silver (Ag) alloy and having a thickness of 100 nm was formed by sputtering on a surface of each of the substrates, which surface had the guiding groove. Subsequently, a dye solution prepared by dissolving a dye shown in FIG. 8 in a TFP solvent was applied on each of the substrates by spin coating. The substrates were then dried at 80° C. for 30 minutes to form a recording layer. These substrates were prepared such that the number of substrates was equal to the number of samples to be tested.

Next, a plurality of types of light-transmissive materials of a protective layer having different values of the indentation plasticity-elasticity were deposited on the samples by sputtering to form a protective layer having a thickness of 0.5 μm. Subsequently, a UV-curable resin whose modulus of elasticity at 25° C. after curing became 35 MPa was applied on each of the prepared samples by spin coating, and then cured, thus forming a second resin layer having a thickness of 25 μm. Next, a UV curable resin whose modulus of elasticity at 25° C. after curing became 1,700 MPa was applied on each of the samples by spin coating, and then cured, thus forming a first resin layer. Thus, a cover layer having a thickness of 0.1 mm was formed from the first resin layer with the second resin layer.

A 6 T-continuous recording (the length of 1 T=0.08 μm) on each of the optical information recording medium samples was performed using a commercially available recording/reproducing system (for example, ODU-1000 manufactured by Pulstec Industrial Co., Ltd.) at a linear velocity of 4.92 m/s, a reproducing power of 0.35 mW, a recording power of 5.5 mW, and a reproducing power during recording (bias power) of 1.2 mW. The value of C/N immediately after recording was measured with a spectrum analyzer. The reproducing power was then increased to 0.55 mW, and a certain track was reproduced for one minute. One minute later, the reproducing power was again decreased to 0.35 mW, and the value of C/N was again measured with the spectrum analyzer. The value of ΔC/N was calculated from a difference between the initial C/N and the C/N measured after reproduction was performed at a reproducing power of 0.55 mW for one minute.

Subsequently, the cover layer of each of the samples after the measurement of ΔC/N was separated from the substrate. The dye was removed by washing so that the protective layer was exposed. The elastic-plastic deformation work and the plastic deformation work were determined by the nanoindentation method at a test load of 0.1 mN to calculate the indentation plasticity-elasticity. Table 2 shows the results.

TABLE 2

|  | Sample 10 | Sample 11 | Sample 12 | Sample 13 |
| --- | --- | --- | --- | --- |
| Elastic-plastic deformation work [N · m] | $3.64 \times 10^{-13}$ | $4.61 \times 10^{-13}$ | $3.54 \times 10^{-13}$ | $2.40 \times 10^{-13}$ |
| Plastic deformation work [N · m] | $1.57 \times 10^{-13}$ | $2.63 \times 10^{-13}$ | $5.31 \times 10^{-13}$ | $5.73 \times 10^{-13}$ |
| Indentation plasticity-elasticity [%] | 69.87 | 63.67 | 40.00 | 29.52 |
| ΔC/N [dB] | 20.29 | 20.01 | 0.66 | 0.105 |

As is apparent from the above results, when the indentation plasticity-elasticity was 40% or less, ΔC/N was 1 dB or less, and thus a protective layer not affecting the degree of modulation could be obtained.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium comprising:
    a substrate having a through-hole provided at the central portion thereof and a spiral guiding groove provided on a surface thereof;
    a reflective layer provided on the surface of the substrate having the guiding groove;
    a recording layer provided on the reflective layer and made of an organic substance containing a dye; and
    a light-transmissive cover layer provided on the recording layer,
    wherein the cover layer is made of a cured resin, and a modulus of elasticity of at least a portion of the cover layer facing the recording layer is in the range of about 34 MPa to about 96 MPa at 25° C. so as to define pits which are formed by projecting into the cover layer away from the recording layer.

2. The optical information recording medium according to claim 1, wherein the cover layer comprises a first resin layer and a second resin layer having a modulus of elasticity lower than the modulus of elasticity of the first resin layer, and the second resin layer faces the recording layer.

3. The optical information recording medium according to claim 2, wherein the recording layer and the second resin layer are configured to deform away from each other when irradiated with a laser beam for recording.

4. The optical information recording medium according to claim 2, wherein a modulus of elasticity of the second resin layer is in the range of about 34 MPa to about 96 MPa at 25° C., and a modulus of elasticity of the first resin layer is about 1,700 MPa at 25° C.

5. The optical information recording medium according to claim 1, further comprising:
    a protective layer disposed between the recording layer and the cover layer,
    wherein an indentation plasticity-elasticity of the protective layer is about 40% or less.

6. The optical information recording medium according to claim 5, wherein recording layer and the portion of the cover layer are configured to deform away from each other when irradiated with a laser beam for recording, and the protective layer is configured to deform so as to conform with the deformation of the cover layer when irradiated with a laser beam for recording.

7. The optical information recording medium according to claim 1, wherein the recording layer and the portion of the cover layer are configured to deform away from each other when irradiated with a laser beam for recording.

8. The optical information recording medium according to claim 1, wherein the portion of the cover layer is about 19 μm to about 30 μm at a position where the guiding groove is present.

9. The optical information recording medium according to claim 1, wherein the modulus of elasticity of the portion is lower than a modulus of elasticity of the substrate.

10. A method of recording data to an optical information recording medium, comprising:
   providing an optical information recording medium comprising a substrate having a through-hole at the central portion thereof and a spiral guiding groove on a surface thereof, a reflective layer provided on the surface of the substrate, a recording layer provided on the reflective layer and made of an organic substance containing a dye on the surface, and a cover layer provided on the recording layer and having at least a portion that faces the recording layer and has a modulus of elasticity of about 34 MPa to about 96 MPa at 25° C.; and
   deforming a section of the recording layer and a section of the portion of the cover layer to form pits which project into the recording layer and the cover layer away from each other by heating the recording layer and portion sections.

11. The method according to claim 10, wherein the heating comprises irradiating the optical information recording medium with a laser beam for recording.

12. The method according to claim 10, further comprising deforming a protective layer provided between the cover layer and recording layer so as to conform with the deformation of the cover layer.

13. A method of manufacturing an optical information recording medium, comprising:
   forming a reflective layer on a surface of a substrate having a through-hole at the central portion thereof and a spiral guiding groove on the surface thereof;
   applying a recording layer on the reflective layer;
   forming a cover layer from a curable resin on the recording layer, wherein a modulus of elasticity of at least a portion of the cover layer after being cured facing the recording layer is in the range of about 34 MPa to about 96 MPa at 25° C. so as to define pits which are formed by projecting into the cover layer away from the recording layer.

14. The method according to claim 13, wherein the portion of the cover layer is about 19 μm to about 30 μm at a position where the guiding groove is present.

15. The method according to claim 13, wherein the modulus of elasticity of the portion is lower than a modulus of elasticity of the substrate.

16. The method according to claim 13, further comprising forming a protective layer between the recording layer and the cover layer, wherein an indentation plasticity-elasticity of the protective layer is about 40% or less.

17. The method according to claim 13, wherein forming a cover layer comprises applying and curing a first resin, and applying and curing a second resin.

18. The method according to claim 17, wherein a modulus of elasticity of the second resin is in the range of about 34 MPa to about 96 MPa at 25° C. after curing, and a modulus of elasticity of the first resin is about 1,700 MPa at 25° C. after curing.

* * * * *